(12) United States Patent
Alduaiji

(10) Patent No.: US 9,163,950 B2
(45) Date of Patent: Oct. 20, 2015

(54) VEHICLE NAVIGATION DEVICE, A METHOD FOR NAVIGATING AND A NON-TRANSITORY COMPUTER READABLE MEDIUM

(71) Applicant: Maan Alduaiji, Ames, IA (US)

(72) Inventor: Maan Alduaiji, Ames, IA (US)

( * ) Notice: Subject to any disclaimer, the term of this patent is extended or adjusted under 35 U.S.C. 154(b) by 0 days.

(21) Appl. No.: 14/163,327

(22) Filed: Jan. 24, 2014

(65) Prior Publication Data

US 2015/0211875 A1    Jul. 30, 2015

(51) Int. Cl.
*G06F 19/00* (2011.01)
*G01C 21/36* (2006.01)

(52) U.S. Cl.
CPC ............ *G01C 21/36* (2013.01); *G01C 21/3629* (2013.01)

(58) Field of Classification Search
CPC .................................................. H04L 45/306
USPC ......... 701/487, 533, 117, 119, 409, 423, 408, 701/410, 447, 527; 455/456.1; 340/988, 340/995.13, 441, 905, 936, 995.23
See application file for complete search history.

(56) References Cited

U.S. PATENT DOCUMENTS

| | | | |
|---|---|---|---|
| 6,169,956 B1 * | 1/2001 | Morimoto et al. | 701/428 |
| 7,595,741 B2 * | 9/2009 | Hovestadt | 340/995.13 |
| 8,294,594 B2 * | 10/2012 | Goudy et al. | 340/905 |
| 2004/0102898 A1 * | 5/2004 | Yokota et al. | 701/210 |
| 2008/0010006 A1 * | 1/2008 | Schwarzmann | 701/202 |
| 2012/0053836 A1 * | 3/2012 | Iaccarino | 701/533 |

FOREIGN PATENT DOCUMENTS

| | | |
|---|---|---|
| CN | 1949295 A | 4/2007 |
| EP | 2 116 984 A1 | 11/2009 |
| JP | 2004-138421 A | 5/2004 |
| JP | 4793227 | 10/2011 |
| WO | WO 2008/083748 A1 | 7/2008 |

* cited by examiner

*Primary Examiner* — Dalena Tran
(74) *Attorney, Agent, or Firm* — Oblon, McClelland, Maier & Neustadt, L.L.P.

(57) ABSTRACT

A vehicle navigation device for use on a vehicle includes a user interface that receives information on a first place and a destination, a GPS sensor that detects a position of the vehicle navigation device, and a memory that stores navigation rules information. The vehicle navigation device also includes circuitry that calculate a plurality of routes from the position of the vehicle to the destination, extracts different navigation rules, which are different from navigation rules of the first place, from navigation rules in the routes, categorizes the different navigation rules into at least two groups of first rules and second rules, determines a route from the plurality of routes, and controls the user interface to output information on the first rules before the vehicle starts driving, output navigation information on the route, and output information on the second rules when the vehicle is where the second rule is applicable.

13 Claims, 9 Drawing Sheets

On this route:
- age requirement for driving is over 18
- drive on the right side of a road
- driving under the influence of alcohol is prohibited

| Traffic Rule | Points |
|---|---|
| Be ready to stop at School Zone | 4 |
| Be prepared to stop at Railroad Crossing | 3 |
| Yield to other traffic | 2 |
| Do not pass | 1 |

FIG. 5

Please choose your route priority:
- ● traffic rule
- ○ distance
- ○ time

VEHICLE NAVIGATION DEVICE, A METHOD FOR NAVIGATING AND A NON-TRANSITORY COMPUTER READABLE MEDIUM

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

In recent years, it has become increasingly common for people to drive a vehicle in foreign countries or drive in plurality of states with different traffic rules. Therefore drivers have to obey the traffic rules in each country or state accordingly. However, it can be difficult to know rules in different countries or states, which are different from the rule he/she is familiar with, and to obey the rules appropriately at appropriate locations. Therefore, sometimes it is dangerous to drive in foreign countries or states where different traffic rules apply.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a vehicle navigation device for use on a vehicle, the device including a user interface that receives information on a first place and information on a destination, a GPS sensor that detects a position of the vehicle navigation device, a memory that stores navigation rules information; and circuitry that calculates a plurality of routes from the position of the vehicle to the destination, extracts, from the memory, different navigation rules, which are different from navigation rules of the first place, from navigation rules of places included in the routes, categorizes the different navigation rules into at least two groups of first rules and second rules, determines a route from the plurality of routes based on a total weight of the different traffic rules and at least one of a total estimated distance and a total estimated time from the position of the vehicle to the destination, and control the user interface to output information on the first rules before the vehicle starts driving, output navigation information on the route, and output information on the second rules in response to the vehicle being within a certain distance from a location where at least one of the second rules is applicable.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is an exemplary point assigned to each navigation rule to calculate a weight of different navigation rules according to one embodiment;

FIG. 7 is an exemplary display of a user interface of the vehicle navigation device to choose a route priority according to one embodiment;

DETAILED DESCRIPTION OF THE EMBODIMENTS

Figure 1:
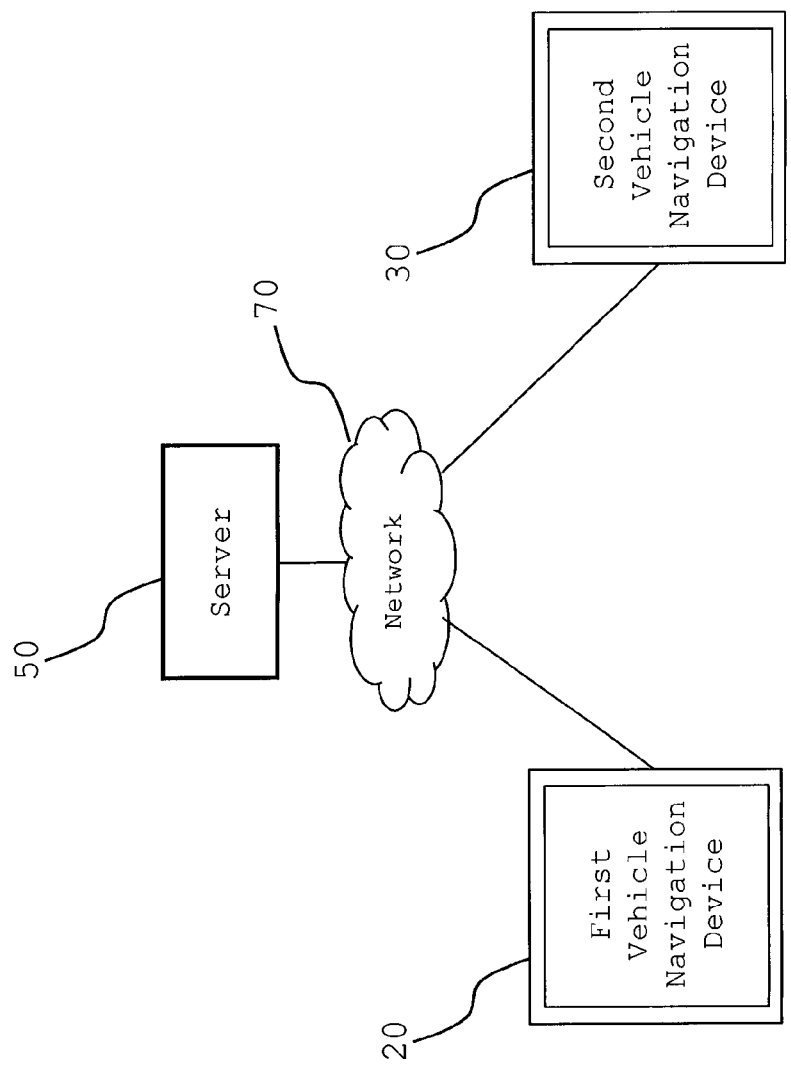
FIG. 1 is an exemplary system for navigating according to one embodiment.

Referring now to the drawings, wherein like reference numerals designate identical or corresponding parts throughout the several views, FIG. 1 is an exemplary system for navigating according to one embodiment. First vehicle navigation device 20 is a vehicle navigation device for use on a vehicle, such as a car. Second vehicle navigation device 30 is another vehicle navigation device for use on a vehicle, such as a car. The vehicle navigation device according to the selected embodiments can be used on various types of vehicle, such as car, motorcycle, bicycle, boat, airplane, on which driver has to obey traffic rules according to the location. The first vehicle navigation device 20 and the second vehicle navigation device 30 are connected to a remote server 50 via wireless network 70 (e.g., internet, telephone line, satellite communications). The first vehicle navigation device 20 and the second vehicle navigation device 30 store navigation rules information in a memory implemented in the vehicle navigation devices 20 and 30. The traffic rules information stored in the memory implemented to the vehicle navigation devices 20 and 30 may be received wirelessly from the remote server 50 via the network 70. The first vehicle navigation device 20 and the second vehicle navigation device 30 may also receive map information from the server 50 via the network 70. In selected embodiments, the first vehicle navigation device 20 and the second vehicle navigation device 30 are configured to receive traffic rule information and/or map information periodically (e.g., once per month) to update the traffic rule information and/or map information.

Figure 2:
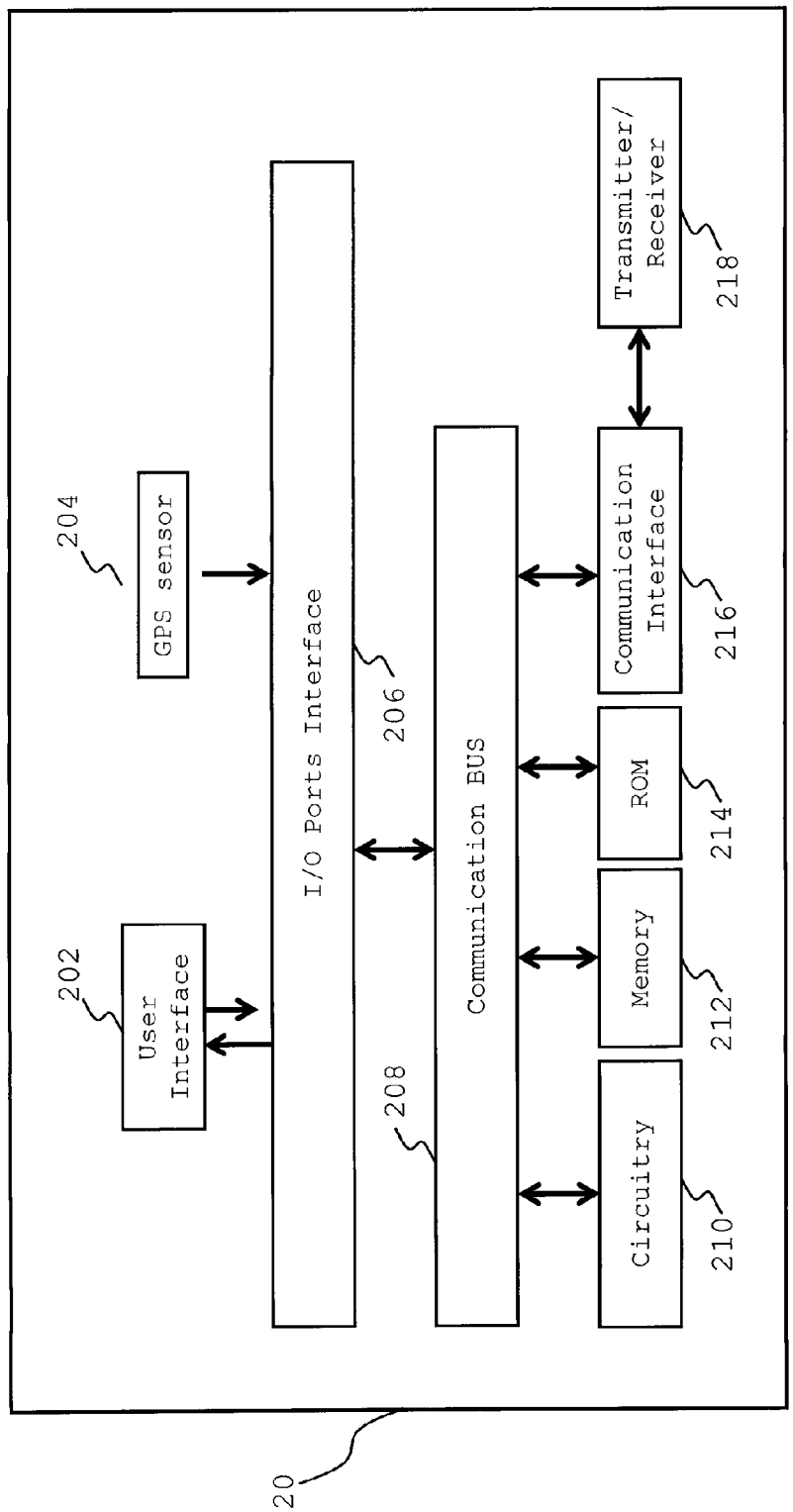
FIG. 2 is an exemplary block diagram of a vehicle navigation device according to one embodiment.

FIG. 2 is an exemplary block diagram of a vehicle navigation device according to one embodiment. The vehicle navigation device 20 includes a user interface 202 that receives information on a first place and information on a destination. The user interface 202 may be such as a touch panel, button, keyboard, microphone to input the information on the first place and the information on the destination. The user interface 202 may include such as a display and/or a speaker to output information (e.g., map information, traffic rules information, navigation information). The first place information may be information on the home address of the driver, and the information on the destination may be information on the destination of the vehicle. In selected embodiments, the information on the first place is stored in memory 212 so that a driver does not have to put the information on the first place every time he drives. In another embodiment, the vehicle navigation device 20 is configured to identify a driver by such as, ID information input to the device 20, a face captured by a camera using face recognition technologies, a voice recorded by a microphone using voice recognition technologies, and automatically retrieve the information on the first place the driver input in the past from the memory 212.

The vehicle navigation device 20 further includes a GPS (Global Positioning System) sensor 204 that detects a position of the vehicle navigation device 20.

The user interface 202 and the GPS sensor 204 are connected to I/O ports interface 206 and exchange data with the interface. The I/O ports interface 206 may include logic to interpret the device address generated by circuitry 210. The I/O ports interface 206 may also include a hand-shaking logic so that the circuitry 210 can communicate with the user interface 202 and the GPS sensor 204 through the interface. The I/O ports interface 206 is also connected to communication BUS 208. Communication BUS 208 is also connected to circuitry 210, memory 212, ROM 214 and communication interface 216. Communication BUS 208 stores information and instructions to be executed by the circuitry 210 and manages the signal transaction between each component in the vehicle navigation device 20. The communication BUS 208 may include a data bus to carry information, an address bus to determine where the information should be sent and a control bus to determine its operation.

Circuitry 210, such as a processing circuitry or a CPU, executes one or more sequences of one or more instructions contained in a memory, such as memory 212. Such instructions may be read into the memory 212 from another computer readable medium, such as a hard disk or removable media drive. One or more processors in a multi-processing arrangement may also be employed to execute the sequences of instructions contained in memory 212. In alternative embodiments, hard-wired circuitry may be used in place of or in combination with software instructions. Thus, embodiments are not limited to any specific combination of hardware circuitry and software.

As stated above, the vehicle navigation device 20 includes at least one computer readable medium or memory, such as memory 212, for holding instructions programmed according to the teachings of the present disclosure and for containing data structures, tables, records, or other data described herein. Examples of non-transitory storage device are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable medium, the present disclosure includes software for controlling the vehicle navigation device 20. Such software may include, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory or transitory medium that participates in providing instructions to the circuitry 210 for execution. A computer readable medium may take many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 212. Transmission media includes coaxial cables, copper wire and fiber optics, including the wires that make up the communication bus 208. Transmission media may also take the form of acoustic or light waves, such as those generated during radio wave and infrared data communications.

Various forms of computer readable media may be involved in carrying out one or more sequences of one or more instructions to circuitry 210 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the vehicle navigation device 20 may receive the data on the phone line and use an infrared transmitter to convert the data to an infrared signal. An infrared detector coupled to the communication bus 208 can receive the data carried in the infrared signal and place the data on the communication bus 208. The communication bus 208 carries data to the memory 212, from which the circuitry 210 retrieves and executes the instructions. The instructions received by the memory 212 may optionally be stored on storage device either before or after execution by circuitry 210.

Memory 212 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 208 for storing in formation and instructions by the circuitry 210. In addition, the memory 212 may be used for storing temporary variables or other intermediate information during the execution of instructions by the circuitry 210.

The first computer device 20 further includes a read only memory (ROM) 214 or other static storage device (e.g., programmable ROM (PROM), erasable PROM (EPROM), and electrically erasable PRM (EEPROM)) coupled to the communication bus 208 for storing static information and instructions for the circuitry 210.

The vehicle navigation device 20 may also include a communication interface 216 coupled to the communication BUS 208. The communication interface 216 provides a two-way data communication coupling to a network link that is connected to, for example, wireless communication network (e.g., cellular networks or wireless LAN) connected to the network 70. In any such implementation, the communication interface 216 sends and/or receives electrical, electromagnetic or optical signals that carry digital data streams representing various types of information. The communication interface 216 may be further connected to a transmitter/receiver 218 including a transmitter and a receiver.

The network link typically provides data communication through one or more networks to other data devices. For example, the network link may provide a connection to the server 50 or the second computer device 30 through the network 70. The first vehicle navigation device 20 may transmit and/or receive data, including program code, through the network(s), the network link, the transmitter/receiver 218 and the communication interface 216. The circuitry 210 may control the transmitter/receiver 218 to transmit information obtained by the user interface 202 or GPS sensor 204 to the server 50 or the second vehicle navigation device 30 through the network 70. The circuitry 210 may control the transmitter/receiver 218 to receive information from the server 50 or the second vehicle navigation device 30 through the network 70 and control the user interface 202 to output the received information.

Figure 3:
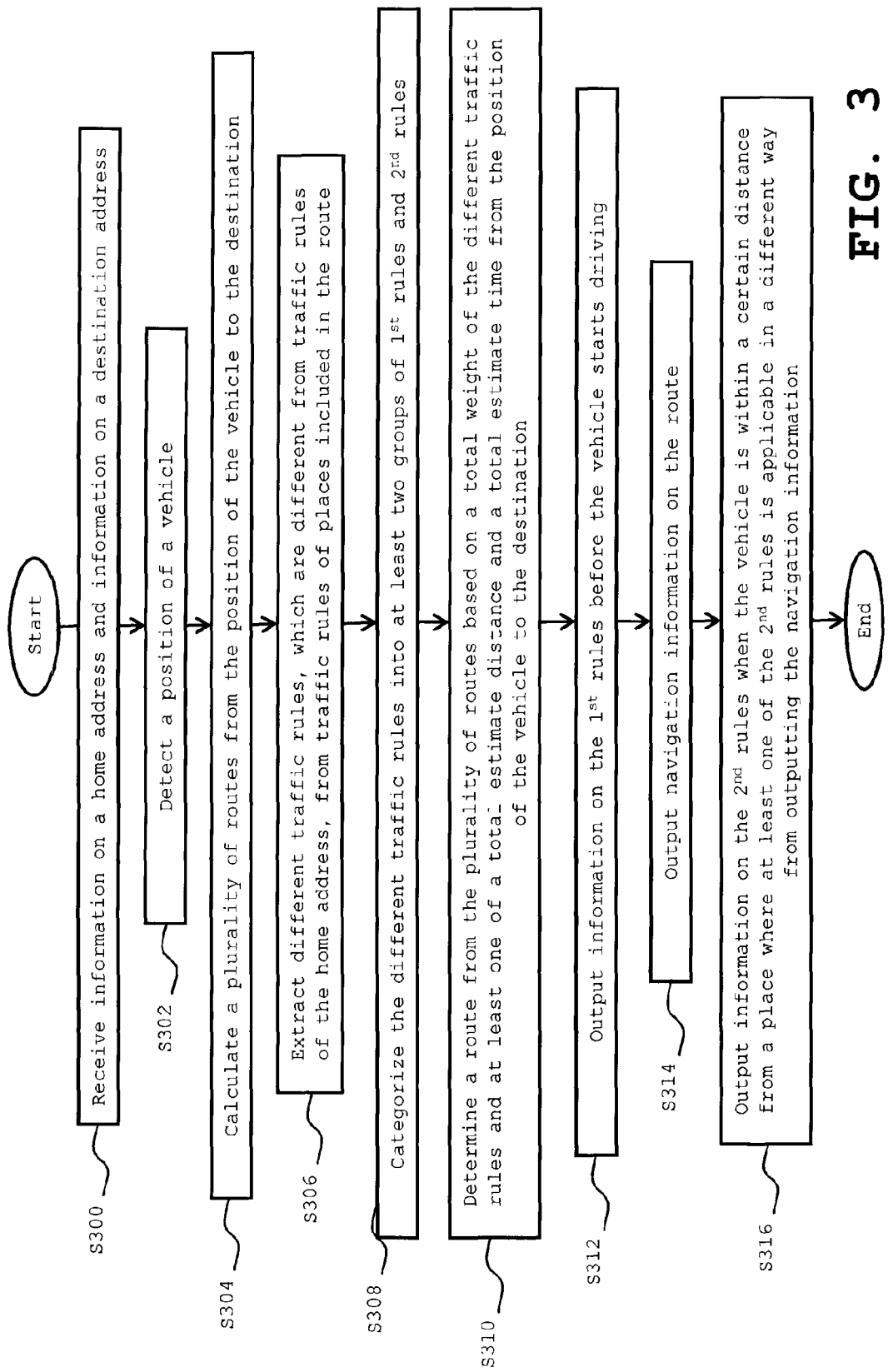
FIG. 3 is an exemplary flowchart of the vehicle navigation device system according to one embodiment.

FIG. 3 is an exemplary flowchart of the vehicle navigation device 20 according to one embodiment. At step 300, user interface 202 receives information on a home address and information on a destination address. For example, a driver inputs "New York" as his information on a home address and inputs "Los Angeles" as his information on a destination address. If the driver is from a foreign country, the driver may input "Japan" etc. as his information on a home address.

Figure 4:
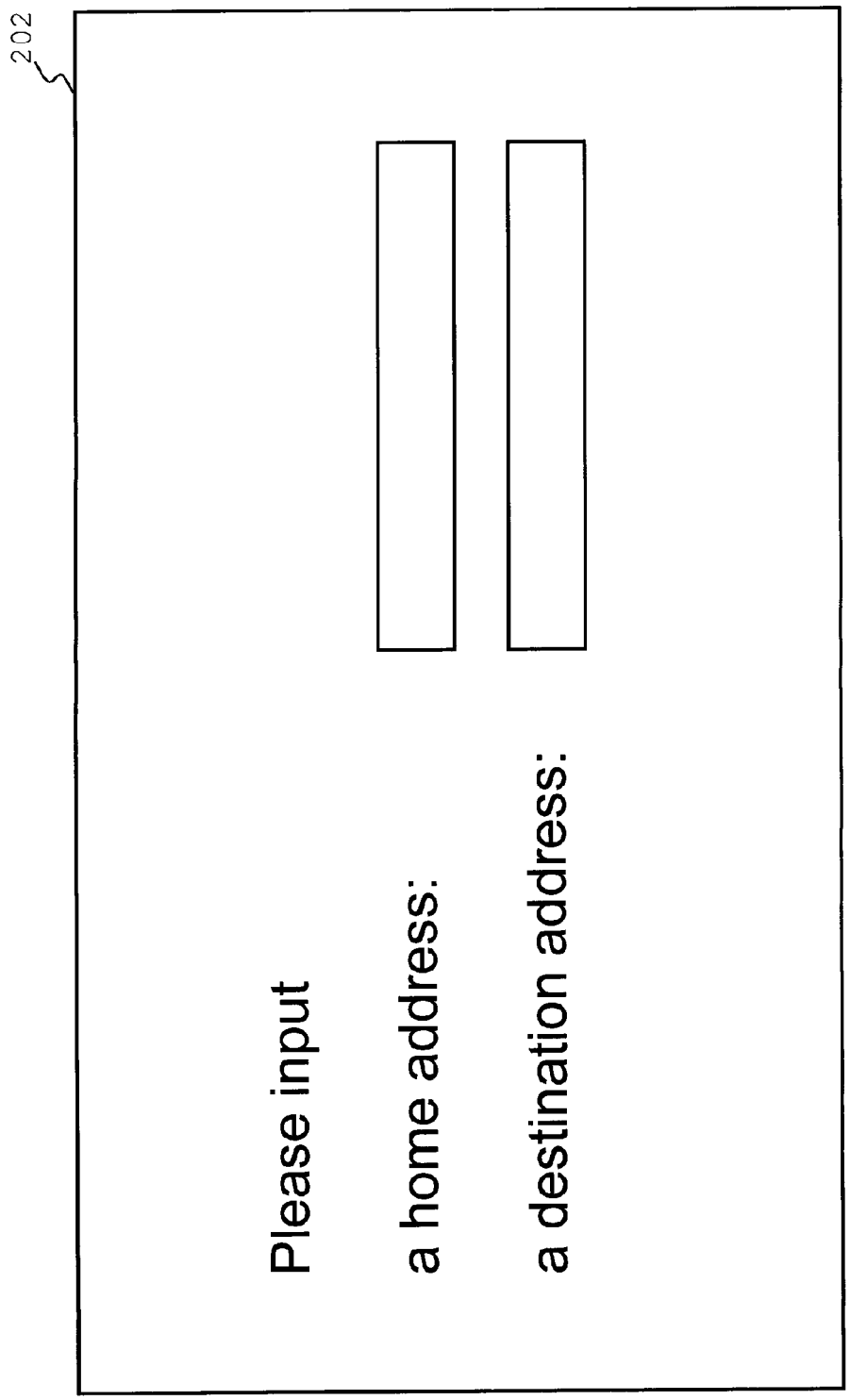
FIG. 4 is an exemplary display of a user interface of the vehicle navigation device to input a home address and a destination address according to one embodiment.

FIG. 4 is an exemplary display of a user interface of the vehicle navigation device to input a home address and a destination address according to one embodiment. As shown in FIG. 4, the user interface 202, such as a LCD display, may outputs a prompt to input information on a home address of a driver on the vehicle and information on a destination address. Instead of a home address, home country or home state may be input as a home address. Here, a home address represents a place having traffic rules familiar to the user of the vehicle navigation device. Therefore, even though a driver was born in Los Angeles, if the driver is not familiar with traffic rules in Los Angeles and rather familiar with traffic rules in Japan, the driver inputs "Japan" as a home address. Instead of "a home address" the user interface 202 may output a prompt, such as "a place where you are familiar with traffic rules". In addition, instead of destination address, name, keyword or phone number of the destination may be input, and the circuitry may search the database in memory 212 or remote server 50 and control the user interface 202 to display the candidates of the destination so that a driver can identify the destination. For example, a driver inputs "Japan" in a box next to "a home address" and inputs "Los Angeles" in a box next to "a destination address".

Then, at step 302 of FIG. 3, GPS sensor 204 detects a position of the vehicle navigation device 20. The GPS sensor 204 may detect a position information of the vehicle periodically (e.g., once per 3 seconds). For example, GPS sensor 204 detects that current position of the vehicle navigation device 20 is "San Francisco".

At step 304, the circuitry 210 calculates a plurality of routes from the position of the vehicle navigation device to the destination based on the information on the home address and the information on the destination address received by the user interface 202, position information of the vehicle detected by the GPS sensor 204, and map information stored in memory 212 which may be received by a wireless receiver 218 from a remote server 50 via network 70. For example, the circuitry 210 calculates a plurality of routes from the position of the vehicle navigation device "San Francisco" to the destination "Los Angeles", based on the information on the home address "Japan" and the information on the destination address "Los Angeles", position information of the vehicle detected by the GPS sensor 204 "San Francisco" and map information stored in memory 212.

Before step 306, the memory 212 may store traffic rules information, which may be stored in the memory 212 originally or received by the receiver 218 from remote server 50 via wireless network 70 and stored in the memory 212. In the selected embodiments, the word "traffic rules" includes "navigation rules" on road (i.e., driving rules), on flight (i.e., flight rules), or on sea, etc. For example, traffic rules in New York may be stored in the memory 212 originally, but traffic rules in Japan may not be stored in the memory 212. In that case, if the driver inputs "Japan" as his home address, the circuitry 210 controls the transmitter 218 to transmit request to transmit information on traffic rules in Japan to remote server 50, and receiver 218 receives information on traffic rules in Japan sent from the remote server 50.

At step 306, the circuitry 210 extract different traffic rules, which are different from traffic rules of the home address, from traffic rules of places included in the routes. Therefore, in the step 306, the circuitry 210 compare the traffic rules of the home address with traffic rules of places included in the plurality of routes calculated. The data of the information on traffic rules may be structured based on categories or items and each category or item is assigned a specific value so that the circuitry can compare the rules and decide if they are the same or different. In order to decide if traffic rules are the same or different by a circuitry, in selected embodiments, data of information on traffic rules is structured in the same way in every states or every countries. For example, the data of information on traffic rules is structured by category and value. For example, "driving on the right side of a road" in the U.S. and "driving on the left side of a road" in Japan are categorized in the same category "category 3", and the rule of "driving on the left side of a road" is assigned a value "1" and the rule of "driving on the left side of a road" is assigned a value "2". The circuitry compare "1" corresponding to "driving on the right side of a road" with "2" corresponding to "driving on the left side of a road" because these are in the same category "category 3", and determine these are different traffic rules. In another example, "age requirement for driving" is categorized in the same category "category 4" with a value, such as "15" in Los Angeles or "18" in Japan depending on states or countries. In yet another example, "response at railroad crossing" is categorized in the same category "category 60" with a value, such as "1" for a traffic rule to require drivers to completely stop at railroad crossing in Japan or "2" for a traffic rule to require drivers to be ready to stop at railroad crossing in Los Angeles.

For example, the circuitry 210 compares traffic rules of Japan (i.e., home address) and traffic rules of places included in the plurality of routes from San Francisco (i.e., current position) to Los Angeles (i.e., destination), and extracts different traffic rules, such as "age requirement for driving" (in Japan: 18, in places from San Francisco to Los Angeles: 15) and "response at railroad crossing" (in Japan: completely stop, in places from San Francisco to Los Angeles: be ready to stop).

At step 308, the circuitry 210 categorizes the different traffic rules extracted at step 306 into at least two groups of first rules and second rules. First rules are traffic rules which are applicable regardless of places in a country or a state (e.g., age requirement for driving, which side of a road to drive, prohibition on driving under the influence of alcohol). Second rules are traffic rules which are applicable only at certain places on the route (e.g., be ready to stop at school zone, be prepared to stop at railroad crossing, yield to other traffic, do not pass other traffic). For example, the circuitry 210 categorizes the different traffic rules, such as "age requirement for driving" (in Japan: 18, in places from San Francisco to Los Angeles: 15) into the first rules, and "response at railroad crossing" (in Japan: completely stop, in places from San Francisco to Los Angeles: be ready to stop) into the second rules. In selected embodiments, the circuitry 201 categorizes the different traffic rules into at least two groups of the first rules and the second rules based on the category number discussed above. For example, category number from 1 to 50, including "age requirement for driving" (i.e., category 4), is categorized into the first rules, and category number from 51 to 100, including "response at railroad crossing" (i.e., category 60), is categorized into the second rules.

At step 310, the circuitry 210 determine a route from the plurality of routes based on a total weight of the different traffic rules and at least one of a total estimate time and a total estimate distance from the position of the vehicle to the destination.

The total weight of different traffic rules may be calculated in various ways. In one embodiment, the total weight of the different traffic rules is calculated based on a number of places on the route where the second rules are applicable. For example, if there are one school zone sign and two yield signs, the total weight is three. In another embodiment, each of the different traffic rules are assigned a point and the total weight of the different traffic rules is calculated based on the total point.

FIG. 5 is an exemplary point assigned to each traffic rule to calculate a weight of different traffic rules according to one embodiment. For example, traffic rule "be ready to stop at School Zone" is assigned point 4 based on the importance. The traffic rule "be prepared to stop at Railroad Crossing" is assigned point 3, the traffic rule "yield to other traffic" is assigned point 2, and "do not pass" is assigned point 1. If there are one school zone sign and two yield signs, the total weight is eight.

The total distance is calculated by calculating the distance of the route from the position of the vehicle to the destination as would be understood by one of ordinary skill in the art. The total estimate time from the position of the vehicle to the destination is calculated, for example, based on average speed information assigned to each road or location on the map that may be received from the remote server 50. The average speed information may change timely based on actual information on traffic flow that may also be received from the remote server 50.

Figure 6:
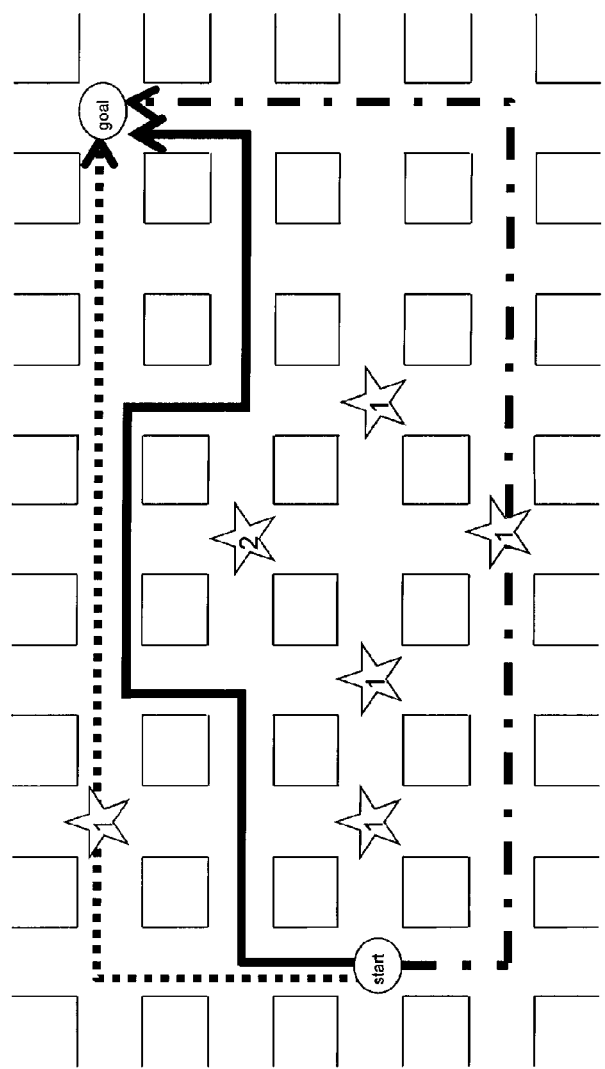
FIG. 6 is an exemplary display of a user interface of the vehicle navigation device to choose a route from plurality of routes according to one embodiment.

FIG. 6 is an exemplary display of a user interface 202 of the vehicle navigation device 20 to choose a route from plurality of routes according to one embodiment. In this embodiment, the user interface 202 displays the plurality of routes including a first route whose total weight of the different traffic rules is the smallest, a second route whose total estimate distance is the smallest and the third route whose total estimate time is the smallest. For example, each of the routes is depicted by different arrow so that the drive can easily distinguish each of the routes. In this example, stars with number indicate places where the second rules are applicable and the number inside the star indicates a point as shown in FIG. 5. Therefore, there are five "do not pass" traffic signs and one "yield to other traffic" traffic sign on this map. The circle with "start" indicates a current position of the vehicle and the circle with "goal" indicates a destination. Before the driver starts driving, he can choose which of the routes to choose by selecting one of three buttons above. For example, the user interface 202 may be a LCD panel with a touch sensor and the driver may choose one of the buttons by touching. Then the circuitry 210 determines the route chosen by the driver as a route for navigation. The driver may choose one of the routes and modify the route manually.

FIG. 7 is an exemplary display of a user interface of the vehicle navigation device to choose a route priority according to one embodiment. In this embodiment, from a setting menu displayed on the user interface 202 for example, the driver can choose which of a first route whose total weight of the different traffic rules is the smallest, a second route whose total estimate distance is the smallest, or a third route whose total estimate time is the smallest, to prioritize, and the circuitry 210 determine the route from the plurality of routes based on the input. Therefore, in this embodiment, once a driver set a priority from the setting menu, a route is chosen automatically by the circuitry 210 based on the priority and the driver does not need to choose a route every time the driver drives with navigation. For example, if a driver chooses "traffic rule" as a priority, the circuitry determine a route whose total weight of the different traffic rules is the smallest. In another embodiment, the user interface 202 may be configured to receive inputs on each percentage or ration for "traffic rule", "distance" and "time" and the circuitry calculate the route according to the percentage or ration. For example, when the user interface 202 receives inputs of "50%" for traffic rule, "20%" for distance and "30%" for time as a calculation priority or a user preference, the circuitry 210 calculate the route according to the percentage.

Then, at step 312 of FIG. 3 and once a route has been selected by the user or determined based on the route priority, the circuitry 210 control the user interface 202 to output information on the first rules before the vehicle starts driving.

Figure 8:
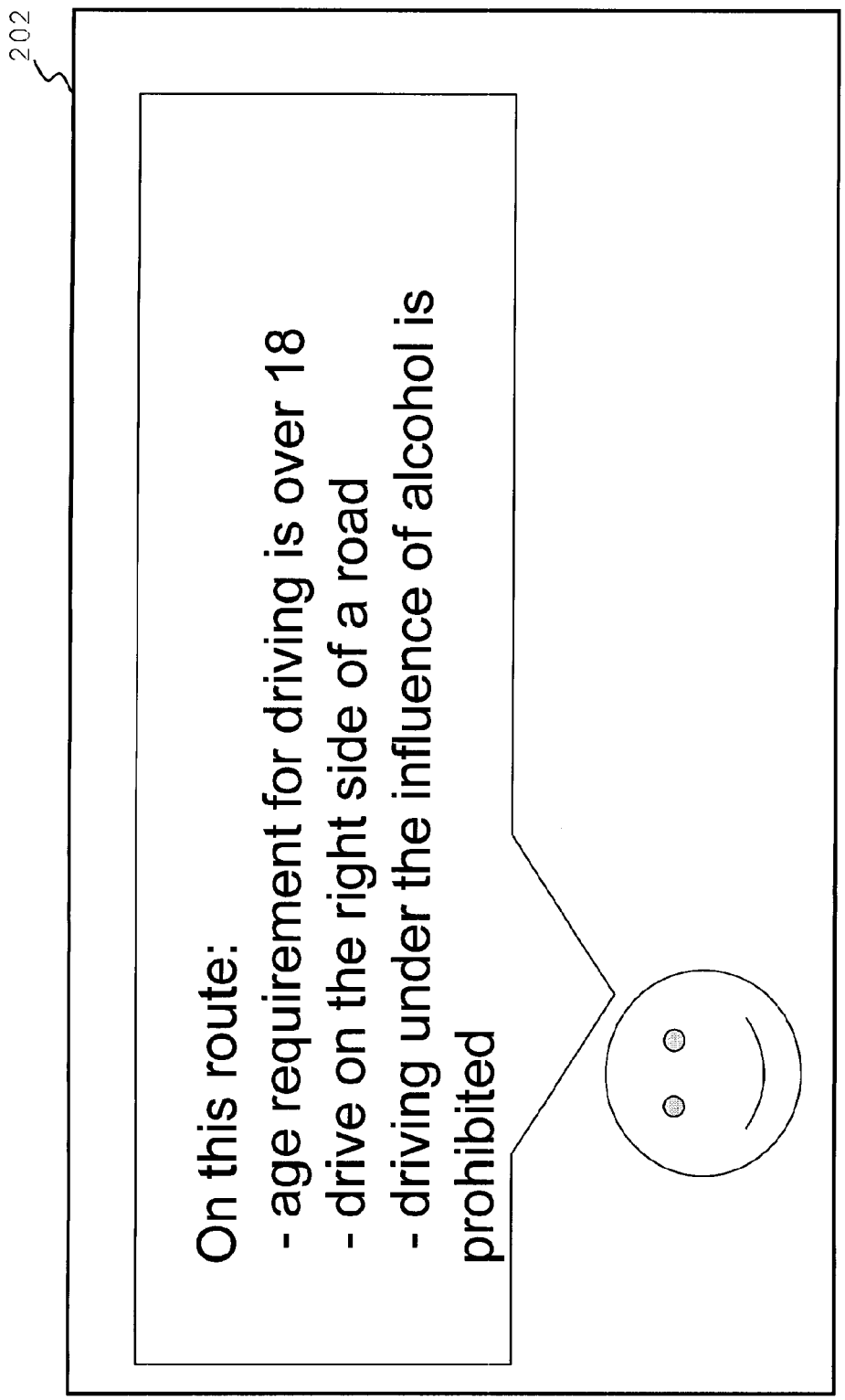
FIG. 8 is an exemplary display of an user interface of the vehicle navigation device to output information on the first rules before the vehicle starts driving according to one embodiment.

FIG. 8 is an exemplary display of a user interface of the vehicle navigation device to output information on the first rules before the vehicle starts driving according to one embodiment. In this example, information on the first rules (e.g., "age requirement for driving is over 15", "drive on the right side of a road", "driving under the influence of alcohol is prohibited") is output before the vehicle starts driving through moving pictures or sounds reproduced on the user interface 202 so that a driver can understand general rules applicable regardless of places on the route. If the route include more than one country or state and traffic rules change on the way, a moving picture saying, such as, "From 6XX K street (i.e., address where different traffic rules start) to 2XX M street (i.e., where different traffic rules end), age requirement for driving is over 18" is reproduced before the vehicle starts driving, and it is preferable the moving picture or an alert is output again when the vehicle is close to or within a certain distance from 6XX K street (the address where different traffic rules start), and an alert notifying the different traffic rule end is output when the vehicle is close to or within a certain distance from 2XX M street (the address where different traffic rules end) so that a driver can understand where different traffic rules start and end beforehand.

Then, at step 314 of FIG. 3, the circuitry 210 control the user interface 202 to output navigation information on the route after the vehicle starts driving. For example, the navigation information is output by human voice from the speaker included in the user interface 202 and/or by picture on the display included in the user interface 202.

At step 316, the circuitry 210 controls the user interface 202 to output information on the second rules when the vehicle is within a certain distance from a place where at least one of the second rules is applicable in a different way from outputting the navigation information. Second rules are traffic rules which are applicable only at certain places on the route, so it is preferable the information on the second rules is output when the vehicle is close to the place where the different traffic rule is applicable so that a driver can understand that different traffic rule applies here. For example, a traffic rule "be ready to stop at railroad crossing" is output from the user interface 202 by both voice and image when the vehicle navigation device 20 is within 300 feet of the railroad crossing. In selected embodiments, the information on the second rules further includes additional information indicating when or where the information on the second rules is output from the user interface 202. For example, information on the second traffic rule "be ready to stop at School Zone" includes information indicating "500 feet" so that this traffic rule is output when the vehicle navigation device 20 is within 500 of the school zone. On the other hand, information on the second traffic rule "Do not pass" may include information indicating "100 feet" so that this traffic rule is output when the vehicle navigation device 20 is within 100 of the school zone.

Figure 9:
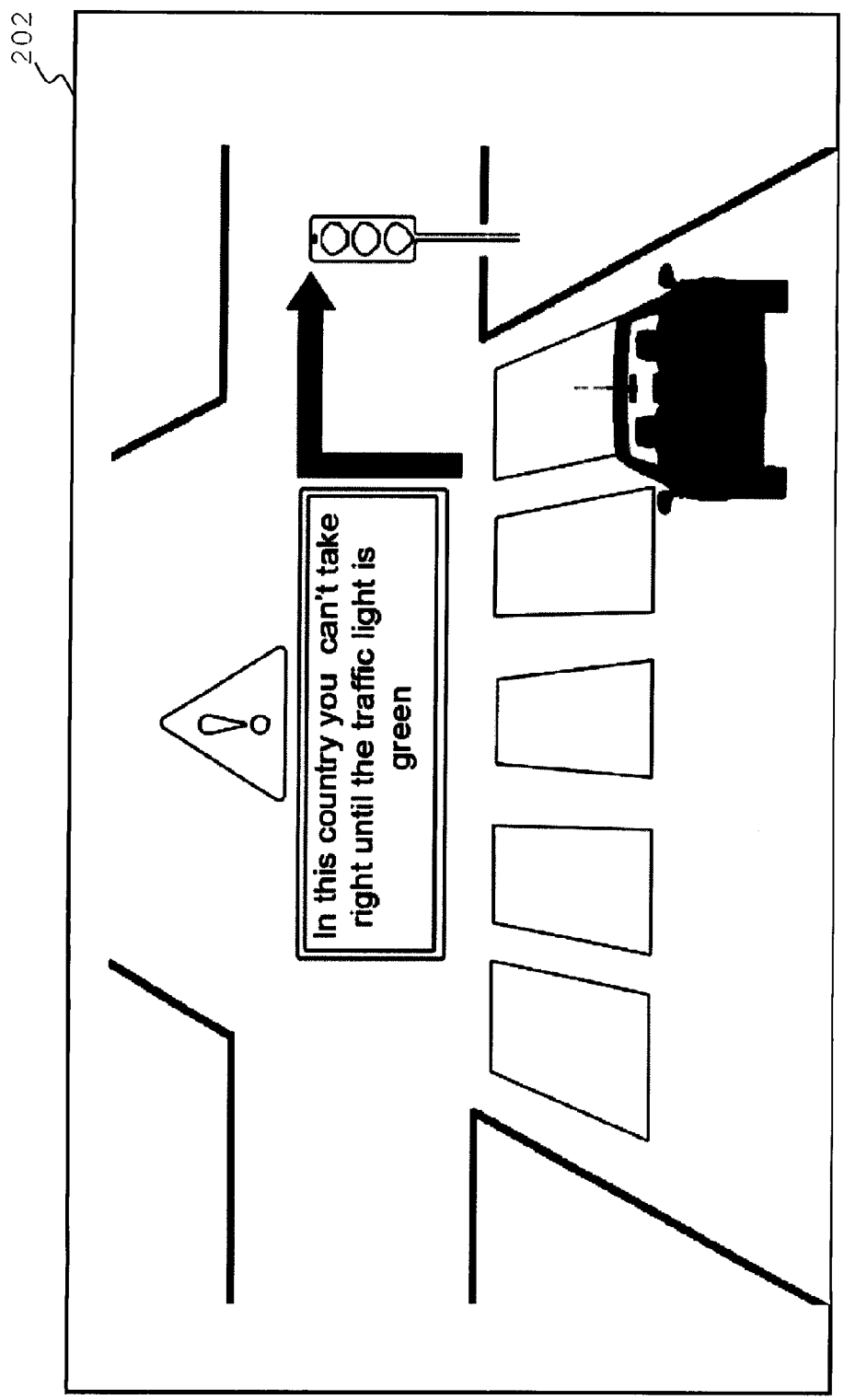
FIG. 9 is an exemplary display of an user interface of the vehicle navigation device to output information on the second rules according to one embodiment.

FIG. 9 is an exemplary display of a user interface of the vehicle navigation device to output information on the second rules according to one embodiment. In this embodiment, a message saying "In this country you can't take right until the traffic light is green" is displayed and read by a human voice via a speaker. In selected embodiments, the navigation information and the information on the second rules is output by different voices so that a driver can identify what type of message is being spoken now.

In addition, in selected embodiments, the circuitry calculates a new route from the current position of the vehicle to the destination when the vehicle is off the route and reroute the vehicle based on the route priority or preference the driver chose.

In another example, information on the different traffic rules, extracted at step 306 of FIG. 3, is kept in the memory 212 even after the vehicle reached the goal and the navigation ended so that the information on the different rules is retrieved from the memory 212 when a new route calculated by the circuitry 210 later includes the route previously calculated. In this way, the circuitry does not need to calculate every time if a new route includes previous routes and a driver can save time for waiting for the calculation.

The vehicle navigation device according to the selected embodiments helps drivers when the drivers go to another country or state where different traffic rules apply so that the drivers can drive safer, avoid fines or troubles with authorities, and drive easier by avoiding routes with a lot of different traffic rules from his home address.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present system are possible in light of the above teachings. It is therefore to be understood that within the scope of the appended claims, the system may be practiced otherwise than as specifically described herein.

The invention claimed is:

1. A vehicle navigation device comprising:
a user interface that receives information on a first place and information on a destination;
a GPS sensor that detects a position of the vehicle navigation device;
a memory that stores navigation rules information; and
circuitry configured to:
calculate a plurality of routes from the position of the vehicle to the destination;
extract, from the memory, different navigation rules, which are different from navigation rules of the first place, from navigation rules of places included in the routes;
categorize the different navigation rules into at least two groups of first rules and second rules, the first rules being navigation rules which are applicable regardless of location of the vehicle within the plurality of routes from the position of the vehicle to the destination, and the second rules being navigation rules which are applicable only at certain locations on the route;
determine a route from the plurality of routes based on a total weight of the different traffic rules and at least one of a total estimated distance and a total estimated time from the position of the vehicle to the destination; and
control the user interface to display information on the first rules only before the vehicle starts driving, output navigation information on the route, and output information on the second rules in response to the vehicle being within a certain distance from a location where at least one of the second rules is applicable while the vehicle is driving, in a different way from outputting the navigation information, wherein
the total weight of the different navigation rules is calculated based on the number of locations where the second rules are applicable.

2. The vehicle navigation device according to claim 1, wherein the user interface displays the plurality of routes including a first route whose total weight of the different navigation rules is the smallest, a second route whose total estimate distance is the smallest, and a third route whose total estimate time is the smallest.

3. The vehicle navigation device according to claim 2, wherein the user interface receives an input selecting one of the plurality of routes and the circuitry determines the route from the plurality of routes based on the input.

4. The vehicle navigation device according to claim 3, wherein the user interface outputs a prompt to input information on a home address of a driver of the vehicle, and the information on the home address of the driver is used as the information on the first place.

5. The vehicle navigation device according to claim 3, wherein the navigation rules information includes category information and value information.

6. The vehicle navigation device according to claim 5, wherein the circuitry extracts the different navigation rules by comparing the value information between the navigation rules information with the same category information.

7. The vehicle navigation device according to claim 6, wherein the navigation rules information of the second rules includes additional information that indicates the certain distance.

8. The vehicle navigation device according to claim 7, wherein the user interface outputs the navigation information by a first voice and outputs the information on the second rules by a second voice that is different from the first voice.

9. The vehicle navigation device according to claim 8, further comprising:
a wireless receiver that receives the traffic rule information from a remote server.

10. The vehicle navigation device according to claim 1, wherein the user interface receives an input selecting a first route whose total weight of the different navigation rules is the smallest, a second route whose total estimate distance is the smallest, or a third route whose total estimate time is the smallest, to prioritize, and the circuitry determine the route from the plurality of routes based on the input.

11. A method for navigating for use on a vehicle, the method comprising the steps of:
receiving information on a first place and information on a destination;
detecting a position of the vehicle;
calculating, via circuitry, a plurality of routes from the position of the vehicle to the destination;
storing navigation rules information;
extracting, via the circuitry, different rules, which are different from navigation rules of the first place, from navigation rules of places included in the routes,
categorizing, via the circuitry, the different navigation rules into at least two groups of first rules and second rules, the first rules being navigation rules which are applicable regardless of location of the vehicle within the plurality of routes from the position of the vehicle to the destination, and the second rules being navigation rules which are applicable only at certain locations on the route;
determining a route from the plurality of routes based on a total weight of the different navigation rules and at least one of a total estimated distance and a total estimated time from the position of the vehicle to the destination, and
displaying information on the first rules only before the vehicle starts driving;
outputting navigation information on the route; and
outputting information on the second rules in response to the vehicle being within a certain distance from a location where at least one of the second rules is applicable while the vehicle is driving, in a different way from outputting the navigation information, wherein
the total weight of the different navigation rules is calculated based on the number of locations where the second rules are applicable.

12. The method for navigating for use on a vehicle according to claim 11, further comprising the steps of:
displaying the plurality of routes including a first route whose total weight of the different navigation rules is the smallest, a second route whose total estimate distance is the smallest, and a third route whose total estimate time is the smallest;
receiving an input on which of the plurality of routes to choose; and
determining the route from the plurality of routes based on the input.

13. A non-transitory computer readable medium including executable instructions, which when executed by a computer cause a computer to execute a method for navigating for use on a vehicle, the method comprising the steps of:
receiving information on a first place and information on a destination;
detecting a position of the vehicle;
calculating, via circuitry, a plurality of routes from the position of the vehicle to the destination;
storing navigation rules information;
extracting, via the circuitry, different traffic rules, which are different from navigation rules of the first place, from navigation rules of places included in the routes,
categorizing, via the circuitry, the different navigation rules into at least two groups of first rules and second rules, the first rules being navigation rules which are applicable regardless of location of the vehicle within the plurality of routes from the position of the vehicle to the destination, and the second rules being navigation rules which are applicable only at certain locations on the route;
determining a route from the plurality of routes based on a total weight of the different navigation rules and at least one of a total estimated distance and a total estimated time from the position of the vehicle to the destination;
displaying information on the first rules only before the vehicle starts driving;
outputting navigation information on the route; and
outputting information on the second rules in response to the vehicle being within a certain distance from a location where at least one of the second rules is applicable while the vehicle is driving, in a different way from outputting the navigation information, wherein
the total weight of the different navigation rules is calculated based on the number of locations where the second rules are applicable.

* * * * *